United States Patent [19]

Feller

[11] Patent Number: 4,890,499
[45] Date of Patent: Jan. 2, 1990

[54] FLUID FLOW DETECTORS

[75] Inventor: Murray F. Feller, Dunnellon, Fla.

[73] Assignee: Model Screw Products, Inc., Clearwater, Fla.

[21] Appl. No.: 119,299

[22] Filed: Nov. 6, 1987

Related U.S. Application Data

[63] Continuation-in-part of Ser. No. 851,803, Apr. 14, 1986, abandoned, which is a continuation-in-part of Ser. No. 677,873, Dec. 4, 1984, Pat. No. 4,581,943.

[51] Int. Cl.⁴ .............................................. G01F 1/05
[52] U.S. Cl. ............................ 73/861.05; 73/861.32
[58] Field of Search ........... 73/861.05, 861.32, 861.77, 73/255; 361/285

[56] References Cited

U.S. PATENT DOCUMENTS

| | | | |
|---|---|---|---|
| 818,566 | 4/1906 | Scotti . | |
| 3,308,660 | 3/1967 | Ford | 73/861.05 |
| 3,861,210 | 1/1975 | Griverus | 73/861.32 |
| 4,089,220 | 5/1978 | Houlberg | 73/255 |
| 4,157,660 | 6/1979 | Spacek | 73/861.05 |
| 4,324,144 | 4/1982 | Miyata et al. | 73/861.77 |
| 4,333,354 | 6/1982 | Feller | 73/861.77 |
| 4,399,696 | 8/1983 | Feller | 73/861.77 X |
| 4,462,262 | 7/1984 | Kahnke | 73/861.05 |
| 4,535,637 | 8/1985 | Feller | 73/861.77 |
| 4,612,806 | 9/1986 | Feller | 73/861.05 X |

FOREIGN PATENT DOCUMENTS

| | | | |
|---|---|---|---|
| 2479978 | 10/1981 | France | 73/861.77 |
| 0144614 | 7/1985 | Japan . | |
| 125908 | 4/1959 | U.S.S.R. . | |
| 724927 | 3/1980 | U.S.S.R. . | |
| 804333 | 11/1958 | United Kingdom | 73/861.77 |

Primary Examiner—Joseph A. Orsino
Assistant Examiner—Kenneth Tso

[57] ABSTRACT

The disclosed orbital ball flow detectors have an exposed ball-sensing electrode near or along the path of the orbiting ball, and a return electrode. The ball's cross-section is much larger than the sensing electrode, which is closely over-shadowed by the ball as it orbits past the electrode. Unusually large signals are provided when the ball is of insulation and the flow to be monitored exhibits some electrical conductivity. Where the ball orbits along a conductive track and is of metal, it acts as a switch when orbiting past the sensing electrode.

33 Claims, 3 Drawing Sheets

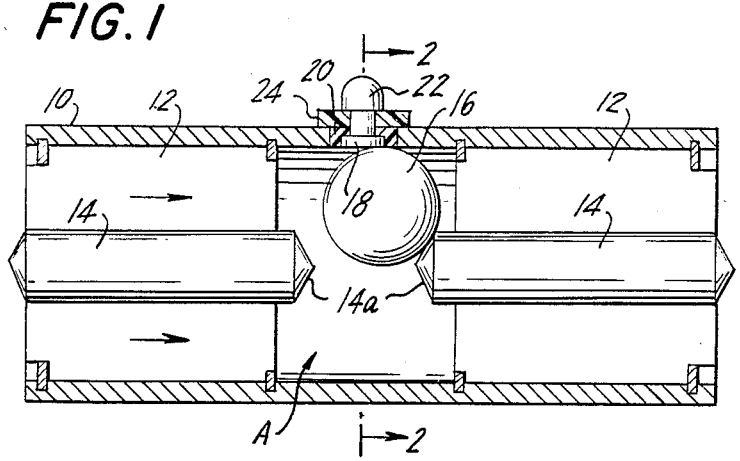
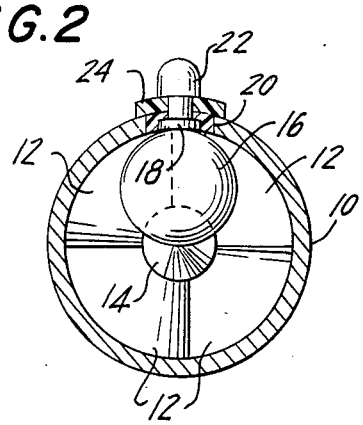
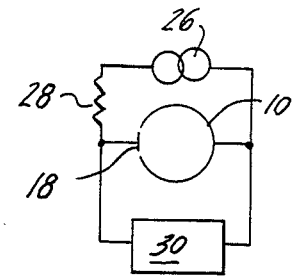
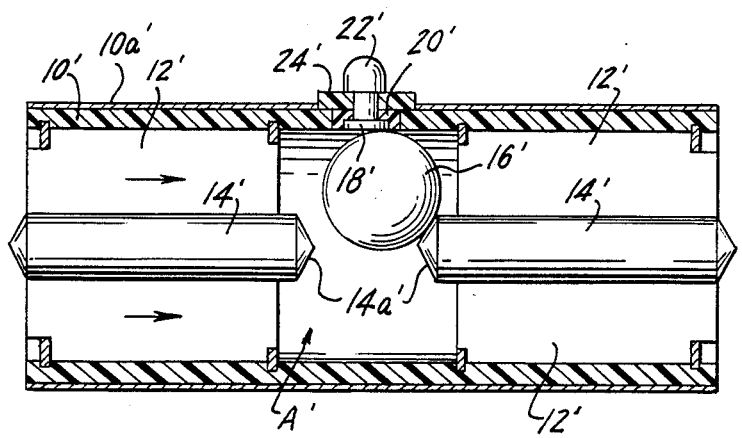

FLUID FLOW DETECTORS

This is a continuation-in-part of application Ser. No. 851,803 filed Apr. 14, 1986 now abandoned which in turn was a continuation-in-part of application Ser. No. 677,873 filed Dec. 4, 1984, which was copending herewith and which issued as U.S. Pat. No. 4,581,943 on Apr. 15, 1986.

The present invention relates to apparatus for monitoring the flow of fluids, and in particular to apparatus for producing signals that represent the flow of fluid in a passage.

Flow-representing signals have been produced using electrodes exposed to liquid such as tap water that has some limited electrical conductivity. Apparatus of that kind is disclosed in my U.S. Pat. Nos. 4,333,354, 4,399,696 and 4,535,637, and in my U.S. patent application Ser. No. 06/7749,267 filed Jun. 27, 1985 and U.S. patent application Ser. No. 06/797,6777, filed Nov. 12, 1985. That apparatus includes excitation and sensing electrodes that develop and sense an electric field pattern in flowing liquid, as modified by the vanes of a liquid-driven rotor. Where the flow-representing signal is amplitude-modulated excitation, the modulation is typically 5% of the excitation. In the patents, particular electrode configurations and circuits are disclosed for developing the flow-representing signals.

The present invention provides novel orbital ball flow detectors in which a sensing electrode is exposed to the fluid whose flow is to be monitored.

In one aspect of the invention, for monitoring the flow of tap water or other liquid that exhibits significant conductivity, both the sensing electrode and a return electrode are exposed to the liquid; the sensing electrode is part of one of a pair of tracks against which the ball bears as it orbits. That form of flow monitoring apparatus yields remarkably high output without depending on critical electrodes or an especially sensitive detection circuit. In one form, the return electrode is a metal pipe that provides most of the outer orbital track.

In another form of novel orbital ball flow detector, a plastic pipe forms the flow passage; and in that case an extended-area return electrode is provided outside the pipe. Remarkably high output can be obtained as the ball momentarily bears against the exposed sensing electrode during its orbits.

In a further aspect of the invention, an orbital ball flow detector is provided that also has an exposed sensing electrode forming a localized part of one orbital track; but in this form, the other orbital track is a conductive electrode and a conductive ball is used. As a result, the ball becomes a switching element as it orbits past the sensing electrode. This flow detector has the advantage of being useful for detecting the flow of non-conductive fluids including liquids such as oil and gases such as air.

In a still further aspect of the invention, an orbital ball bears against tracks so as to orbit near and overhang and over-shadow an exposed electrode. The illustrative flow detector has a return electrode of extended area. This flow detector is useful for liquid whose resistivity contrasts with the ball's resistivity and for fluids that contrast with the ball's dielectric constant. This distinguishes from the capacitive sensor shown in my application Ser. No. 677,873. In this novel orbital ball flow detector, the orbiting ball does not bear against a thin layer of insulation that covers the sensing electrode, so that there is no concern here of the ball bearing on and eroding the thin insulating layer.

In another application of the invention, a ball made of electrical insulation orbits past the sensing electrode which is exposed to the flow passage but recessed from the orbital track. The ball may closely overhang a cavity containing the sensing electrode or its orbital track may cross the center of the cavity opening. The orbiting ball serves as a momentary current barrier across the cavity opening, virtually switching off the collective current paths through the fluid in the passage.

In a number of flow detectors of the invention, the orbiting ball is of electrical insulation. Substitution of a conductive orbiting ball provides alternative flow detectors having their own distinctive merit.

The invention in its various aspects will best be appreciated by reviewing the detailed descriptions appearing below of illustrative embodiments of the invention shown in the accompanying drawings, each embodiment having its own distinctive features and advantages.

In the drawings:

FIG. 1 is a longitudinal cross-section of a novel orbital ball flow detector embodying certain features of the invention;

FIG. 2 is a cross-section of the embodiment in FIG. 1 as seen at the plane 2—2 of FIG. 1;

FIG. 3 is a diagram of a circuit forming part of the flow detector of FIGS. 1 and 2;

FIGS. 4, 5 and 6 are longitudinal cross-sections of modifications of the embodiment of FIG. 1 illustrating further aspects of the invention.

Figure 5:
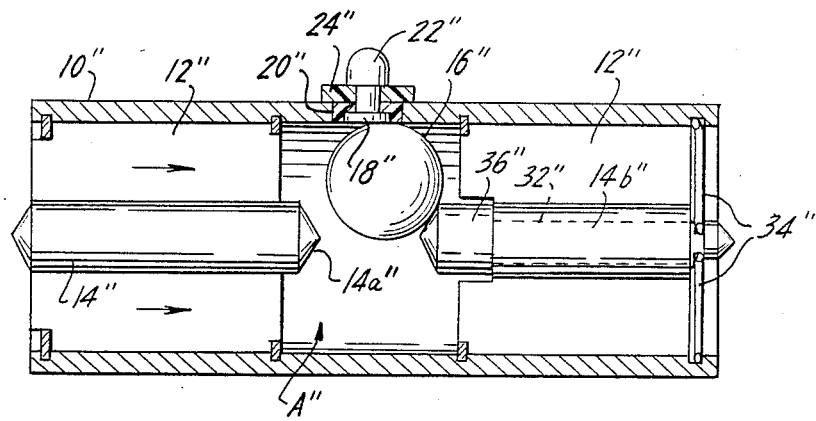

Referring now to the drawings, FIGS. 1–3 represent apparatus for monitoring the flow of liquid such as tap water that has limited electrical conductivity. (As seen below, this apparatus is also useful for monitoring the flow of non-conducting fluid such as petroleum and air.) A flow passage is defined by metal pipe 10. Two sets of vanes 12 on rods 14 are separated by sensing region A, each set of vanes being fixed in a position by suitable retaining rings. Each of the vanes projects radially from rod 14. Each set of vanes and its rod are of electrical insulation, advantageously being molded as one piece. Rods 14 are aligned with each other along the axis of pipe 10. All of the vanes extend outward radially from a rod 14 and they have a spiral twist, end-to-end. Consequently, fluid that flows along pipe 10 develops a swirling pattern around the axis of the pipe in the orbital region A.

Ball 16 of insulation is induced to orbit in the sensing region by the swirling fluid. The flowing fluid presses ball 16 against an outer circular track formed largely by the inner cylindrical surface of pipe 10 and an inner circular track provided by the conical end 14a of the down-stream rod 14. Both rod ends 14a are conical, because the form of flow detector in FIG. 1 operates the same for the direction of flow represented by the arrows in FIG. 1 and for the opposite direction. The orbital ball 16 in this example has a diameter roughly equal to the radius of pipe 10.

A sensing electrode 18 has an area exposed to the flow passage. That exposed area of the sensing electrode and the surrounding insulation 20 are trued to form a continuation of the cylindrical inner surface of the pipe. Accordingly, the outer track along which ball 16 orbits is a continuous circle.

In concept, the outer track including sensing electrode 18 could be formed as a separate structure in region A, distinct from pipe 10; but the construction shown has distinct advantage, in that it results in a smooth uninterrupted flow passage with little turbulence, its cost is low, and it avoids bumps and crevices where dirt might accumulate. The ends of rods 14 and the exposed edges at the opposite ends of vanes 12 are tapered to reduce turbulence.

Conical ends 14a of rods 14 are spaced apart far enough to be sure that ball 16 can orbit freely, bearing against only one conical end 14a. The exposed area of electrode 18 is large enough to be sure that the electrode forms part of the outer orbital track against which the ball bears, both for the direction of flow represented by the arrows in FIG. 1 and for the opposite direction of flow. Electrode 18 extends to an external terminal 22. Washer 24 of insulation assures a tight leak-proof seal around the electrode. Washer 24 is advantageously held tightly against the pipe by a clamping band (not shown) around the pipe.

An electrical circuit (FIG. 3) for the flow detector of FIGS. 1 and 2 includes an excitation source 26 connected to sensing electrode 18 and to pipe 10 through a series impedance 28. An electric field pattern develops in the flow passage between pipe 10, which acts as a return electrode, and sensing electrode 18. The pipe represents an electrode having extensive area at various distances from the sensing electrode. When the fluid in the passage is tap water, the electric current that flows between the electrodes is relatively high compared to a reduced current while ball 16 rolls over the sensing electrode. The high resistivity of the ball greatly exceeds that of tap water, which explains the current change. This occurs when direct-current excitation is used and at low and moderate-frequency alternating current. The dielectric constant of the ball in relation to that of water becomes an added factor that affects the current reduction at high excitation frequencies as the ball orbits past the sensing electrode. The pipe and the sensing electrode that are exposed to the flow passage in this embodiment and others detailed below, should be corrosion-resistant in relation to the fluid. Moreover, when direct-current excitation is used, particular attention should be used in choosing the electrode material, graphite and platinum being recommended.

The direct contact of the ball against the electrode is an important factor in the magnitude of the result. The shadowing effect of the ball that overhangs the localized electrode where there is no actual contact also has a large effect on the pattern of current paths through the liquid between the sensing electrode and the return electrode. It may be imagined that the electric field pattern has many current paths through the liquid from electrode 18 to ball 16 in the region where the ball overhangs the electrode. Those paths are short and thus have little electrical resistance (compared to ball 16) when the liquid is tap water. Accordingly, ball 16 acts in effect to suppress a large part of the electric current pattern that develops when the ball has orbited away from electrode 18.

In an example, ball 16 is ¼-inch diameter in a metal pipe of ⅜-inch inside diameter; sensing electrode 18 is 0.115 inch diameter by 0.020 inch thick, surrounded by a 0.005-inch wide band of insulation 20 at the passage surface. Using 15-volt (peak-to-peak) excitation at 100 kHz and a resistor 28 of 1,000 ohms, a voltage change across the electrodes occurs from 11 volts (peak-to-peak) when the ball is absent to 12.6 volts with the ball at the sensing electrode. With a resistor 28 of 10,000 ohms and the same excitation source voltage, a voltage of 3.6 volts develops across the electrodes with no ball present, which changes to 5.6 volts with ball 16 centered at the sensing electrode. With 100k ohms, the corresponding voltages developing at the electrodes were 1.0 volts and 1.5 volts. Similar values are obtained with excitation frequencies of 1.0 kHz and 10 kHz. In these examples, both the magnitude and the modulation percentage are large values.

The resistivity of the liquid is a factor that affects the signal amplitude. That factor is of little significance, i.e. the amplitude of the signal changes little despite wide variations in the resistivity of the liquid, where the series resistance is so large as to convert the series resistor and the excitation source into a constant-current source.

The output signal produced by the electrodes is notably large, without relying on amplification, compared to other sensors that use vanes of a rotor moving past sensing electrodes in my patents '354, '696 and '637 and my applications '267 and '611 mentioned above; and the output signal is not dependent on a sensitive detection circuit as in the orbital sensor of my application S.N. 677,873 mentioned above. Accordingly, the flow monitoring apparatus is remarkably insensitive to stray electric fields that might develop spurious signals, usually an important concern where sensitive detection circuits are needed.

The dimensions above result in an eminently successful flow monitor for liquid like tap water having some electrical conductivity. In another example, a ball of 2⅜ inch diameter was used with sensing electrodes in the form of ¼-inch and ⅜-inch discs in a much larger diameter flow passage, with comparable results.

Figure 11:
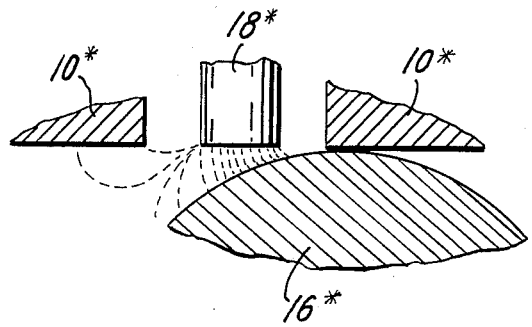
FIG. 11 is an enlarged fragmentary diagrammatic view of the embodiment in FIG. 6 incorporating a conductive ball.

The apparatus of FIGS. 1–3 is also useful for monitoring the flow of non-conductive fluids such as petroleum and air. That apparatus, with its exposed sensing electrode against which the ball orbits, develops relatively high output and is relatively immune to spurious signal conditions, although more sensitive circuits are used to respond to the orbiting ball. The circuit of FIG. 3 may include more elaborate detail, ordinarily including amplification when non-conductive liquids are used. The detector circuits in FIGS. 11, 12 and 13 shown and described in my application Ser. No. 06/797,611 are excellent for this purpose. Those circuits and their description are incorporated herein by reference.

FIG. 4 represents a modification of FIG. 1. The parts bear primed numbers in FIG. 4 corresponding to like-numbered parts in FIGS. 1 and 2. FIG. 4 is a flow detector in which the pipe 10' is of plastic, an electrical insulator, covered with a conductive layer as of electrically conductive paint 10a' as the return electrode. The rest of FIG. 4 is the same as FIG. 1, so that further detailed description is omitted as unnecessary. The flow detector of FIG. 4 requires a circuit that uses a-c excitation, inasmuch as the insulating pipe blocks direct-current.

FIG. 3 represents a suitable detector circuit. That circuit can take many forms, such as FIGS. 11 and 13 of my application Ser. No. 06/797,611 filed Nov. 12, 1985 which, with the related description, are incorporated here by reference.

Notably in FIG. 4, sensing electrode 18' is exposed to the fluid in the passage and is engaged by the orbiting ball. The current pattern is highly concentrated at electrode 18' and spreads, extending to large-area return electrode 10a'. Where the liquid is tap water or like liquid that exhibits significant electrical conductivity, the large area of dielectric represented by the pipe 10' provides a large capacitance for the parallel current paths from sensing electrode 18' to return electrode 10a'. Rolling of ball 16' against electrode 18' interrupts a large part of the pattern of current paths between the electrodes. The changed condition represented by ball 16' passing exposed electrode 18' is relatively prominent. The area of electrode 10a' far from the sensing electrode 18' may make little contribution to the operation, so that electrode 10a' may be limited and not extend over the whole exterior of pipe 10'.

In each of the embodiments of FIGS. 1 and 4, the ball is of polypropylene or like insulator, having the approximate density of water. Where the passage is horizontal (as in the drawings) and the ball is denser than that of the fluid to be monitored, particularly when the flow rate is low, the ball tends to settle to the bottom of the passage. Under such circumstances, it would be well to mount the flow monitor so that the flow passage is vertical, and then the ball would be stable at all parts of its orbit. The direction of flow then should be downward, ordinarily.

Hollow light-weight metal balls are available that are suitable for orbital flow monitors. The embodiment of FIG. 4 using a metal (or other conductive) ball in place of the insulating ball described above has the effect of increasing considerably the output each time the ball rolls against the sensing electrode.

FIG. 5 shows another form of novel orbital ball flow monitoring apparatus having an exposed sensing electrode, in common with the flow monitors described above. The same numbers are used in FIGS. 1 and 5 for corresponding parts, except that all the numbers in FIG. 4 are distinguished by ("). Unlike cone 14a in FIG. 1, cone 14a" is provided solely for avoiding undue turbulence. Also, the flow monitor of FIG. 5 is designed for only the direction of flow indicated by the arrows. As is apparent, such apparatus can readily be adapted for opposite directions of flow.

In FIG. 5, ball 16" is a metal thin-walled and hollow sphere, having a weight approximately equal to the weight of fluid it displaces. In monitoring the flow of air, it should simply be as light as practical.

Rod 14 at the right in FIG. 1 is replaced by tube 14b", uniting the right-hand set of vanes 12". Tube 14b" contains metal rod 32". Spring wires 34" are received in respective grooves in rod 32" and pipe 10", serving as a retainer for vane unit 12"–14b" and as an electrical connector from rod 32" to pipe 10". A conductive bearing member 36" as of graphite is supported by rod 32", preferably in a manner allowing free rotation. Bearing member 36" forms the inner orbital track for ball 16".

In operation, ball 16" is induced to orbit about the axis of the flow passage by swirling fluid in the sensing region A". As the ball orbits, it tends to rotate member 36". Once in each orbit, ball 16" connects electrode 18" to member 36", thus acting in effect as a switch that connects electrode 18" to metal pipe 10". When the flow monitoring device of FIG. 5 is connected in the circuit of FIG. 3, one large impulse is produced for each orbit of the ball.

The swirling flow pattern presses the ball against both of the orbital tracks, so that fixed contact 18" is dependably engaged each time the ball orbits past that contact. Moreover, the ball keeps the contact clean in the orbiting process, both by rolling over the electrode and because of a twisting component of the ball's engagement with the outer track. The same rolling contact of the ball against the inner track member 36" keeps that contact clean, supplemented by a twisting component of the ball at its point of contact with member 36". Rotation of member 36" is caused by the twisting effect where the ball is pressed against the bearing member 36". Rotation of member 36" due to that twisting component reduces the otherwise larger twisting component, but some twisting (hence scrubbing) effect persists, at both the inner track on member 36" and the outer track that includes electrode 18".

The electrical contact may sporadically have significant resistance. Where liquid to be monitored has significant conductivity, the liquid in the regions immediately surrounding the actual points of contact provides conduction that supplements the mechanical points of contact. However, to minimize the effect of occasional high contact resistance even when nonconductive fluid is to be monitored, the detection circuit should be designed to have high impedance.

Each of the flow detectors described above in detail involves an electrode that forms a localized portion of the outer orbital track against which the ball is pressed as it orbits. The space and the fluid are eliminated at that spot, eliminating the fluid as an impedance at that part of the field pattern. In the immediate area surrounding the contact spot, there is a thin volume of fluid between the ball and the electrode. That thin volume represents short electrode-to-ball distances of the field pattern and correspondingly low impedance.

In applications of the apparatus to monitor tap water and other liquids that are somewhat conductive, and particularly where the detection circuit has high impedance, those short lengths of path along the imaginary lines of the field pattern are almost as effective as actual contact.

In FIGS. 1 and 4, when the ball is of insulation having high resistivity compared to somewhat conductive fluid to be monitored, and when the ball is opposite the sensing electrode, the ball over-shadows or shields the electrode in a region of high field concentration. In contrast, when the ball has orbited away from the electrode, the conduction pattern of the electric field comes into effect. The result is a change that represents relatively large signal output and high signal-to-noise ratio.

In applications for monitoring insulating fluids such as petroleum and air, relatively high excitation frequencies should be used. Also, there should be a large contrast between the dielectric constants of the ball and the fluid. The ball then has a pronounced effect when present at the sensing electrode as contrasted with the electric field that comes into effect after the ball has orbited away from the sensing electrode.

The effect of a ball made of conductive material in the apparatus of FIG. 5 is profound, producing a large contrast between the condition of the apparatus when the ball is at the sensing electrode and when it has orbited away from that electrode, both when somewhat conductive liquid is being monitored and when the fluid is essentially insulating.

Figure 6:
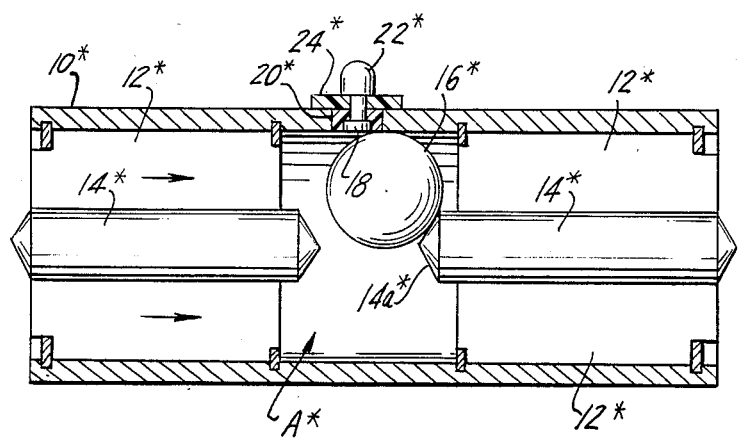

FIG. 6 represents a related feature of the invention. There, the sensing electrode is located so that the ball orbits near it but does not come into contact with that electrode. In FIG. 6, parts corresponding to those of FIG. 1 have the same numbers, distinguished in FIG. 6 by (*). The detailed description of FIG. 6 is omitted to the extent that the apparatus of FIG. 6 is the same as that of FIG. 1.

In FIG. 6, ball 16* orbits against the conical end 14a* of rod 14*. Ball 16' is of insulation, and it orbits just to the right of contact 18* (in the condition of FIG. 6) so that the ball always bears against an outer orbital track provided by the inside surface of metal pipe 10*. Electrode 18* is off-center relative to the two vane-and-rod units 12*, 14*. Accordingly, this flow monitor, as shown, is useful for only the direction of flow indicated by the arrows. The circuit for providing excitation of sensing electrode 18* and return electrode 10* and for deriving flow-representing signals is as shown in FIG. 3. That circuit may take many specific forms, for example those of my applications Ser. No. 06/677,873 and Ser. No. 06/797,611 that are incorporated here by reference. Greater sensitivity is needed here than with the apparatus of FIG. 1. Less sensitivity is needed with the apparatus of FIG. 6 than that which is shown in my 1943 patent, and the apparatus of FIG. 6 avoids the effects of possible wear of the insulation covering the sensing electrode. Because the ball is so close to electrode 18* and overhangs that electrode at one part of its orbit, the ball — when of insulation — obstructs the concentrated electric field that tends to develop at the sensing electrode when tap water or other somewhat conductive liquid is being monitored. The result is relatively high output signal and signal-to-noise ratio.

As a further variation, pipe 10* may be replaced by a pipe of insulation bearing an external return electrode as in FIG. 4. High excitation frequency is needed for such apparatus, 1.0 MHz, for example. High excitation frequency is also recommended for the apparatus of FIG. 6 when the fluid to be monitored is non-conducting and has a dielectric constant that contrasts with that of the ball.

In each of the flow detectors described above and shown in the drawings, the orbital ball is proportioned to over-shadow the sensing electrode that forms a localized part of the outer orbital track and is exposed to the fluid passage. In the examples above, the exposed sensing electrode is much smaller than the cross-section of the ball, so that the ball over-shadows or shields the sensing electrode in a region of high field concentration, as noted above. In all of the flow detectors except FIG. 6, the ball bears against the sensing electrode, twisting slightly at the contact area and keeping it clean. The actual contact of the ball with the sensing electrode and their close proximity around the spot where they are in contact contribute to high signal output, most notably in the embodiment of FIG. 1 where tap water or like liquid is the fluid to be monitored. In each of the embodiments shown, the entire volume of flow is contained in a pipe; but the same structure can be suspended in a much larger conduit, to serve as a probe for monitoring part of the cross-section of the conduit as in my U.S. Pat. No. 4,399,696. Moreover, while the preferred forms of flow detectors utilize the inside surface of each flow passage as the outer orbital track (the sensing electrode being part of that orbital track) the orbital track and sensing electrode can be a separate structure spaced inward of the inner surface of the passage.

Figure 7:
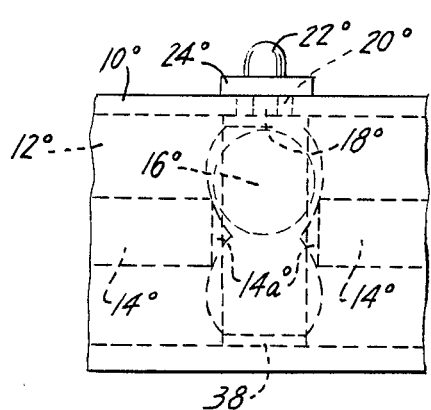
FIG. 7 is a fragmentary lateral view of a modification of the flow detector of FIGS. 1–3.
Figure 8:
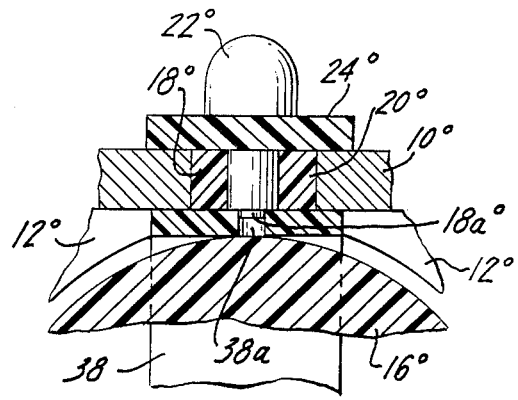
FIG. 8 is an enlarged fragmentary longitudinal cross-section of the flow detector of FIG. 7.

FIGS. 7 and 8 represent a further feature of the invention, related to FIGS. 1 and 4 and particularly related to FIG. 6. In FIGS. 7 and 8, parts corresponding to FIG. 1 have the same numbers, distinguished in FIGS. 7 and 8 by (°). The detailed description of FIG. 1 is omitted to the extent that the two devices are the same.

Ball 16° orbits around the axis of the passage defined by tubular wall 10°, bearing against the inner track on conical end 14a° of one swirling-vane unit 12°, 14°, and against the outer track represented by a short tube or sleeve 38 of insulation. Sensing electrode 18° has a short cylindrical end portion 18a° that fits into a cavity 38a in insulator 38.

Ball 16° orbits against outer and inner circular tracks provided by insulator 38 and a conical end 14a°. In an example, ball 16° is $\frac{1}{8}$ inch in diameter, cavity is 0.030 inch to 0.050 inch in diameter and electrode portion 18a° is recessed 0.015 inch from the inner surface of sleeve 38. Sleeve 38 in this example is 0.025 inch thick and $\frac{1}{2}$-$\frac{3}{4}$ inch long (along the package's axis). Portion 18a° projects 0.010 inch into a hole in sleeve portion 18a°, thus fixing cavity 38a in alignment with electrode 38.

It is contemplated that the device of FIGS. 7 and 8 is to be used for flow in only one direction, e.g. left to right in FIG. 7. Conical end 14a° against which ball 16° bears is so located that the outer orbital track of the ball traverses the center of cavity 38a. As the ball orbits across the cavity's opening, the ball forms a near-perfect closure. If the ball and sleeve 38 have high resistivity — compared to the resistivity of liquid flowing through the device — the pattern of current paths reaching the exposed sensing electrode portion 18a° is switched off, in effect.

It is also contemplated that the device of FIG. 7 is to be useful for either direction of flow. In that design, ball 16° has a small clearance from one conical surface 14a° when the ball is pressed against the other surface 14a°. The outer race is then arranged to be off-center slightly relative to cavity 38a for each flow direction. Ball 16°, orbiting past cavity 38a, interrupts nearly all of the pattern of current paths that are concentrated at the cavity opening when the ball is displaced from opening 38a.

The switching effect of the ball in relation to the recessed electrode contributes to production of a large flow-representing signal. The construction shown has the further effect of providing a smooth outer track for the ball — being of one material that becomes uniformly worn during the useful life of the device. This contrasts with other forms of construction wherein segments of the outer orbital track are provided by metal and plastic elements. In that construction, the different segments of the track become worn differently and may develop objectionable bumps along the outer track. The small size of the cavity opening relative to the large cross-section of the ball tends to eliminate the cavity opening as a potential bump along the outer track.

The tubular wall is represented as metal in FIG. 8. If a tubular wall of insulation were used as in FIG. 4, then the return electrode could be provided as in FIG. 4 and then alternating-current excitation would be used.

Most of the flow detectors described above have balls as of polypropylene or other high resistivity insulators.

Figure 9:
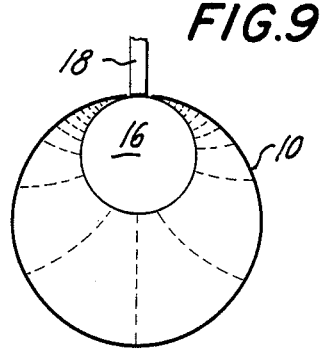
FIGS. 9 and 10 are diagrammatic cross-sections of the flow sensor of FIGS. 1 and 2, with a conductive orbital ball in two different positions.
Figure 10:
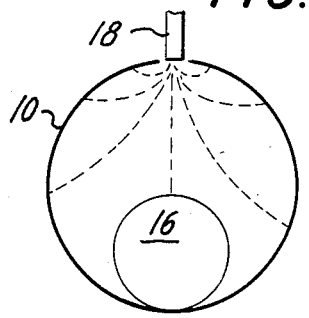

FIGS. 9 and 10 represent the flow detector of FIGS. 1–3 when a ball of electrically conductive material is used, and when tap water or other liquid having significant electrical conductivity fills the flow passage. The ball may be of metal — aluminum, for example — and it may be hollow to have near-zero buoyancy in use. The ball may also be made of various plastics formulated with carbon black or similar material to impart high electrical conductivity.

As seen in FIG. 9, sensing electrode 18 is exposed to the flow passage in metal tube 10, and ball 16 in FIG. 9 engages electrode 18. When engaged with sensing electrode 18, ball 16 becomes an electrical extension of electrode 18, and (as shown) a high-density pattern of short current paths develops which represents comparatively low resistance between electrodes 18 and 10. In contrast, when ball 16 is far from electrode 18 (FIG. 10) the high-density short-length current paths of FIG. 9 are sharply curtailed so that the resistance between electrodes 10 and 18 is comparatively high. The metal orbiting ball in the apparatus of FIG. 1 is thus capable of yielding large flow-representing signal excursions in the circuit of FIG. 3.

Where the tubular wall 10 is of insulation, a return electrode as in FIG. 4 may be provided, using a-c excitation at a suitable frequency. Correspondingly, the flow of non-conducting fluid such as air or refined petroleum can be monitored with a conductive ball in the detectors of FIGS. 1 and 4, using a-c excitation at a suitable frequency.

In a further modification, the structure of FIG. 6 may be used with a conductive ball, as represented in FIG. 11 and where ball 16* orbits against a track that is slightly offset from electrode 18*. Ball 16* closely overhangs the sensing electrode 18* so that the ball sustains a high density of short current paths in passing by the sensing electrode. In FIG. 11, the outer orbital track of the ball is along metal wall 10* that defines the passage.

The foregoing illustrative embodiments of the invention and modifications are amenable to further changes by those skilled in the art, so that the invention should be construed broadly in accordance with its true spirit and scope.

What is claimed is:

1. Apparatus for sensing the flow of fluid including a tubular wall of insulation that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow pattern to orbit about the axis of said tubular wall and to bear against and thereby define said inner and outer circular tracks, a localized sensing electrode exposed to the flow passage in the orbital region, and a return electrode separated from said passage by said wall of insulation, said sensing electrode being smaller than the ball's cross-section and being fixed in such relation to said outer track that the ball overhangs the sensing electrode at least in close proximity thereto consistently as it orbits repeatedly past the sensing electrode, and circuit means for providing excitation between said sensing electrode and said return electrode for establishing an electric field pattern in said orbital region concentrated at said sensing electrode and for deriving flow-representing signals in response to orbiting of the ball past the sensing electrode.

2. Apparatus as in claim 1, wherein said ball is of high-resistivity insulation.

3. Apparatus as in claim 1, wherein said sensing electrode forms part of said outer track against which the ball bears as it orbits.

4. Apparatus as in claim 3 wherein said ball is of high-resistivity insulation.

5. Apparatus as in claim 1, wherein said sensing electrode is offset somewhat from said outer track so that the ball overhangs and is momentarily near but does not contact the sensing electrode during its orbital travel.

6. Apparatus as in claim 5, wherein said ball is of high-resistivity insulation.

7. Apparatus for sensing the flow of fluid including a tubular metal wall that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow pattern to orbit about the axis of said tubular wall and to bear against and thereby define said inner and outer circular tracks, a localized sensing electrode smaller than the ball's cross-section and exposed to the flow passage in the orbital region, said sensing electrode being fixed in such relation to said outer track that the ball overhangs the sensing electrode at least in close proximity thereto consistently as it orbits repeatedly past the sensing electrode, and circuit means for providing excitation between said sensing electrode and said tubular metal wall for establishing an electric field pattern in said orbital region concentrated at said sensing electrode and for deriving flow-representing signals in response to orbiting of the ball past the sensing electrode.

8. Apparatus as in claim 7, wherein said ball is of high-resistivity insulation.

9. Apparatus as in claim 7 wherein said exposed sensing electrode is disposed along the outer circular track of the ball so as to be engaged by the ball as it orbits.

10. Apparatus as in claim 9, wherein said ball is of high-resistivity insulation.

11. Apparatus as in claim 7, wherein said sensing electrode is offset somewhat from said outer track so that the ball overhangs and is momentarily near but does not contact the sensing electrode during its orbital travel.

12. Apparatus as in claim 11, wherein said ball is of high-resistivity insulation.

13. Apparatus for use with fluid having significant electrical conductivity, tap water for example, including a tubular wall that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow pattern to orbit about the axis of said tubular wall and to bear against said inner and outer circular tracks, a sensing electrode fixed in relation to said outer track and exposed to the flow passage in the orbital region so that the track establishes a uniform path of the ball as it orbits past the sensing electrode, and means for providing excitation for said electrode to establish an electric field pattern in said orbital region concentrated at said electrode and for deriving flow-representing signals in response to orbiting of the ball past the sensing electrode, said sensing electrode forming part of said outer track against which the ball bears as it orbits and said tubular wall being of metal and being connected in said circuit means to act with the sensing electrode in establishing said electric field pattern, and said ball being of electrical insulation.

14. Apparatus for sensing the flow of fluid including a tubular wall that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow pattern to orbit about the axis of said tubular wall and to bear against said inner and outer circular tracks, a sensing electrode forming a fixed part of said outer track against which the ball bears as it orbits and exposed to the flow passage in the orbital region so that the track establishes a uniform path of the ball as it orbits past the sensing electrode, and means for providing excitation for said electrode to establish an electric field pattern in said orbital region concentrated at said electrode and for deriving flow-representing signals in response to orbiting of the ball past the sensing electrode.

15. Apparatus as in claim 14 wherein said tubular wall is of metal and is connected in said circuit means as a return-circuit electrode and said ball is formed of a high-resistivity insulator.

16. Apparatus as in claim 14 wherein said tubular wall is of electrical insulation bearing an external electrical conductor connected in said circuit means as a return-circuit electrode.

17. Apparatus for sensing the flow of fluid including a tubular wall that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow pattern to orbit about the axis of said tubular wall and to bear against said inner and outer circular tracks, a sensing electrode fixed in relation to said outer track and exposed to the flow passage in the orbital region so that the track establishes a uniform path of the ball as it orbits past the sensing electrode, and means for providing excitation for said electrode to establish an electric field pattern in said orbital region concentrated at said electrode and for deriving flow-representing signals in response to orbiting of the ball past the sensing electrode, said ball being of insulation and being much larger in cross-section than the exposed surface of said sensing electrode and said sensing electrode being disposed along the outer track so as to be engaged and over-shadowed by said ball as the ball orbits past that electrode.

18. Flow monitoring apparatus for liquid having appreciable electrical conductivity, including a tubular metal wall forming a liquid flow passage, a ball of electrical insulation having much higher resistivity than that of the liquid whose flow is to be monitored, means for constraining the ball to move in a circular orbit about an axis that extends along said passage, said constraining means including means forming a circular track against which the flowing liquid presses the ball and bearing means acting with the track to establish said circular orbit, means for developing a spiralling liquid flow pattern along and around said axis for inducing the ball to bear against and orbit along said track, and a sensing electrode exposed to the liquid in said passage, said sensing electrode being smaller than the ball's cross-section and being at least in close proximity to said ball in the course of its orbital movement so as to be over-shadowed by the ball, and an electrical circuit connected to said sensing electrode and to said tubular metal wall as a return electrode for establishing a pattern of electrical conduction paths between said electrodes modulated by said flow-driven ball and for detecting ball-induced modulation of the current flowing between said electrodes as the ball orbits.

19. Apparatus as in claim 18 wherein said sensing electrode is disposed along the outer track so as to be engaged by said ball as the ball orbits past that electrode.

20. Apparatus as in claim 18 wherein said sensing electrode is offset somewhat from said outer track so that the ball does not contact the sensing electrode when it over-shadows the sensing electrode.

21. Apparatus for sensing the flow of fluid having relatively high resistivity, oil for example, including a tubular wall that defines a flow passage, vane means that establishes a swirling fluid-flow pattern in the passage about the axis of the tubular wall at an orbital region of the passage, a ball in said orbital region, said apparatus including means forming outer and inner circular tracks about said axis, all of the foregoing being arranged so that the ball is induced by said swirling fluid-flow patterns to orbit about the axis of said tubular wall and to bear against and thereby define said inner and outer circular tracks, a first electrode forming part of said outer track and exposed to the flow passage in the orbital region so that the ball bears against the first electrode in orbiting about said axis, said ball being an electrical conductor, a second electrode forming at least part of said second track and being engaged by said ball when the latter bears against said first electrode so that the ball and the electrodes constitute a switch, and circuit means connected to said electrodes for deriving flow-representing signals as the ball orbits around said axis.

22. Flow monitoring apparatus for liquid having appreciable electrical conductivity, including a tubular wall of insulation forming a liquid flow passage, a ball of electrical insulation having much higher resistivity than that of the liquid whose flow is to be monitored, means for constraining the ball to move in a circular orbit about an axis that extends along said passage, said constraining means including means forming a circular track against which the flowing liquid presses the ball and bearing means acting with the track to establish said circular orbit, means for developing a spiralling liquid flow pattern along and around said axis for inducing the ball to bear against and to orbit along said track, a sensing electrode exposed to the liquid in said passage, and a return electrode separated from said passage by said wall of insulation, said sensing electrode being smaller than the ball's cross-section and being at least in close proximity to said ball in the course of its orbital movement, and an electrical circuit connected to said electrodes for establishing a pattern of electrical conduction paths between said electrodes modulated by said flow-driven ball and for detecting ball-induced modulation of the current flowing between said electrodes as the ball orbits.

23. Apparatus as in claim 22, wherein said sensing electrode forms part of said outer track against which the ball bears as it orbits.

24. Apparatus as in claim 22, wherein said sensing electrode is offset somewhat from said outer track so that the ball overhangs and is momentarily near but does not contact the sensing electrode during its orbital travel.

25. Apparatus for sensing the flow of fluid having appreciable electrical conductivity, including a tubular wall that defines a flow passage, vane means that establishes a spiralling fluid-flow pattern in said passage along and around the axis of the tubular wall at an orbital region of the passage, a ball of electrical insulation in said orbital region, the resistivity of the ball being substantially higher than that of the fluid whose flow is to be monitored, said apparatus including means forming outer and inner circular tracks extending about said axis and being disposed at greater and lesser radii from said axis, respectively, all of the foregoing being arranged so that the ball is induced by said spiralling fluid-flow pattern to orbit about the axis of said tubular wall and to bear against and thereby define said inner and outer circular tracks, a localized sensing electrode in the orbital region and a return electrode, an electrical insulator forming a barrier between said sensing electrode and said passage except for a cavity in said insulator that opens into the passage and exposes the sensing electrode to the flow passage so that the sensing electrode is recessed from said passage, said sensing electrode and the opening of said cavity into the passage being much smaller than the ball's cross-section and being so related to said outer track that the ball overhangs said opening of the cavity at least in close proximity thereto consistently in the course of its orbits, and circuit means for providing excitation between said sensing electrode and said return electrode for establishing an electric field pattern in said orbital region concentrated at said sensing electrode and for deriving flow-representing signals as the ball orbits past the sensing electrode.

26. Apparatus as in claim 25 wherein the opening of the cavity into the passage is located along said outer track, said opening and the ball being proportioned so that the ball essentially blocks said opening in the course of its orbits.

27. Apparatus as in claim 25 wherein said electrical insulator extends around said passage and constitutes said outer track.

28. Apparatus as in claim 25 wherein said electrical insulator that forms said barrier is a band extending around said axis and bears against said cylindrical wall, said cavity being formed in said band and said sensing electrode extending through said tubular wall and into said cavity, said sensing electrode, additional to its function as an electrode, serving to retain the band in position relative to the tubular wall.

29. Apparatus for sensing the flow of fluid having appreciable electrical conductivity including a tubular wall that defines a flow passage, vane means that establishes a spiralling fluid-flow pattern in the passage along and about the axis of the tubular wall at an orbital region of the passage, a ball of highly conductive material in said orbital region, said apparatus including means forming outer and inner circular tracks about said axis, all of the foregoing being arranged so that the ball is induced by said spiralling fluid-flow pattern to orbit about the axis of said tubular wall and to bear against said inner and outer circular tracks, a sensing electrode exposed to the flow passage in the orbital region and disposed so that said tracks establish a uniform orbital path of the ball at least close to the sensing electrode, the exposed portion of the sensing electrode being much smaller than the ball's cross-section, and means for providing an electric excitation field pattern in said orbital region concentrated at said sensing electrode and for deriving flow-representing signals in response to orbiting of the ball past the sensing electrode.

30. Apparatus as in claim 29 wherein said sensing electrode is disposed along said outer track and is contacted by said ball in the course of its orbits.

31. Apparatus as in claim 29, wherein said tubular wall is of metal and constitutes said return electrode.

32. Apparatus for sensing the flow of fluid including a tubular wall of metal that defines a flow passage, vane means that establishes a swirling fluid-flow pattern in the passage about the axis of the tubular wall at an orbital region of the passage, a ball of electrical insulation in said orbital region, said apparatus including means forming outer and inner circular tracks about said axis, all of the foregoing being arranged so that the ball is induced by said swirling fluid-flow pattern to orbit about the axis of said tubular wall and to bear against and thereby define said inner and outer circular tracks, a localized sensing electrode in the orbital region, said metal tubular wall constituting a return electrode, an electrical insulator forming a barrier between said sensing electrode and said passage except for a cavity in said insulator that opens into the passage and exposes the sensing electrode to the flow passage so that the sensing electrode is recessed from said passage, said sensing electrode and the opening of said cavity into the passage being much smaller than the ball's cross-section and being so related to said outer track that the ball overhangs said opening of the cavity at least in close proximity thereto consistently in the course of its orbits, and circuit means for providing excitation between said sensing electrode and said return electrode for establishing an electric field pattern in said orbital region concentrated at said sensing electrode and for deriving flow-representing signals as the ball orbits past the sensing electrode.

33. Apparatus for sensing the flow of fluid including a tubular wall of insulation that defines a flow passage, vane means that establishes a swirling fluid-flow pattern in the passage about the axis of the tubular wall at an orbital region of the passage, a ball of electrical insulation in said orbital region, said apparatus including means forming outer and inner circular tracks about said axis, all of the foregoing being arranged so that the ball is induced by said swirling fluid-flow pattern to orbit about the axis of said tubular wall and to bear against and thereby define said inner and outer circular tracks, a localized sensing electrode in the orbital region, a return electrode disposed on the exterior of said tubular wall of insulation, said apparatus providing an electrical insulator forming a barrier between said sensing electrode and said passage except for a cavity in said insulator that opens into the passage and exposes the sensing electrode to the flow passage so that the sensing electrode is recessed from said passage, said sensing electrode and the opening of said cavity into the passage being much smaller than the ball's cross-section and being so related to said outer track that the ball overhangs said opening of the cavity at least in close proximity thereto consistently in the course of its orbits, and circuit means for providing alternating current excitation between said sensing electrode and said return electrode for establishing an electric field pattern in said orbital region concentrated at said sensing electrode and for deriving flow-representing signals as the ball orbits past the sensing electrode.

* * * * *